June 4, 1968  B. MOUISSIE  3,386,680
DEVICE FOR FASTENING THE END OF A FILM OR
TAPE ON A SPOOL
Filed Dec. 20, 1966
FIG.1
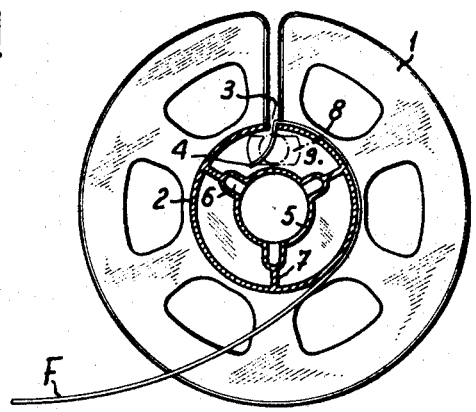
FIG.2
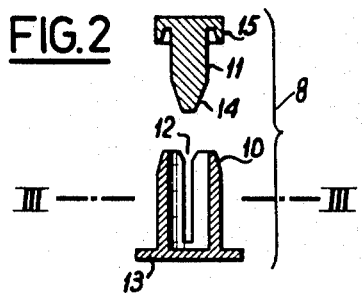
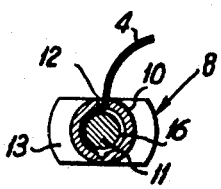
FIG.3
INVENTOR
BOB MOUISSIE
BY Emery L. Groff Jr.
ATTORNEY

United States Patent Office 3,386,680
Patented June 4, 1968

3,386,680
DEVICE FOR FASTENING THE END OF A FILM OR TAPE ON A SPOOL
Bob Mouissie, Yverdon, Vaud, Switzerland, assignor to Paillard S.A., Sainte-Croix, Vaud, Switzerland, a corporation of Switzerland
Filed Dec. 20, 1966, Ser. No. 603,272
Claims priority, application Switzerland, Jan. 6, 1966, 153/66
3 Claims. (Cl. 242—74.1)

ABSTRACT OF THE DISCLOSURE

A fastener for securing the end of a strip member to a spool and adapted to be positioned within a spool hub. The fastener includes a slotted sleeve and a mating plug member adapted to wedge the strip end therebetween.

---

The invention has for scope the hooking of cinematographic films and magnetic strips on their spool.

It is known to secure the end of a tape on a spool, in particular a tape for a recording apparatus. Generally, the spool is provided, in its hub, with a plug serving as a fixing point for the end of the tape which is constituted by a closed loop.

In certain cases, it may be desirable to be able to secure firmly the end of a film on a spool which has not been provided to this end. Thus, certain cinematographic projectors are provided with a automatic rewinding device at the end of the projection, wherein the film must remain secured to the hub of the spool so that rewinding may be carried out without manual intervention. In such projectors, one generally makes use of the increase of the tension of the film which occurs at the end of the projection in order to start the winding operation.

The invention has for an object to permit safe fastening of the end of a film of a strip on a spool which has not been provided to this end.

The invention has for an object a device for fastening the end of a film or strip on a spool with a slit hub, said hub having a recess opposite the slot, characterized in that it comprises an independent piece, adapted to be inserted in said recess, and an arresting element adapted to be inserted in a housing of substantially corresponding shape, provided in the piece, the wall of said housing having at least one slot extending parallel to the axis of the element placed in the housing, said slot permitting the insertion of the end of the film or strip in the housing so as to be held therein by tightening between the element and the wall of the housing.

This device may, for example, be produced so as to permit a secure fastening of the end of a film already wound on a spool without causing tearing, when the spool is provided with a slit hub and a recess opposite the slot in which the end of the film is already engaged.

The accompanying drawing shows, diagrammatically and by way of example, one embodiment of the device object of the invention.

FIG. 1 is a section of the spool of a cinematographic film along its main plane.

FIG. 2 shows said embodiment of the film fastening device.

FIG. 3 is a section along line III—III of FIG. 2.

FIG. 1 shows the spool of a standard device, of synthetic resin, and having two side supports only one of which is visible in the drawing and is designated by 1. These two side supports are connected by a cylindrical hub 2 having an axial slot 3 to permit the insertion of the end 4 of a film F.

Inside the hub 2, which constitutes the bearing surface for the winding of the film, is a sleeve-shaped portion 5 provided with three radial cavities 6 adapted to permit the attachment of the spool on a driving shaft. The portion 5 is connected to the hub 2 by arms 7.

In FIG. 1, there is shown at 8, in dot and dash lines, the site for a fastening device adapted to hold firmly the end of the film on the spool. This device 8 is housed in a recess 9 included between the hub 2 and the portion 5 opposite the slot 3.

The fastening device represented by FIG. 1 by the reference numeral 8 is shown in FIGS. 2 and 3. This device is constituted by two parts 10 and 11 of synthetic resin. The part 10 is in the shape of a sleeve with a conical end having a longitudinal slot 12 for the insertion of the film, said sleeve terminating at its other end is a plate 13. The part 11 has the shape of a plug tapered at 14 at one of its ends and carrying at its other end a head with an inner cone 15 permitting of gripping the same easily.

FIG. 3 shows how the gripping of the film in said fastening device is produced. The end 4 of the film is inserted in the slot 12, so that the extreme end of the film penetrates inside the sleeve 10, in to a cylindrical housing 16. Thereafter, the arresting element constituted by the plug 11 is inserted into said housing, which deforms the end of the film while gripping it between said plug and the inner wall of the sleeve 10, the two cones of the two pieces penetrating one into the other to increase the gripping.

When the spool is of the kind shown in FIG. 1, as is generally the case for cinematographic films when they are sent back by the developing laboratory, it is easy to fix the film to the spool without previously having to unwind the film. To this end, one inserts in the recess 9 the sleeve-shaped piece 10 by engaging the slot 12 on the end 4 of the film. There only remains to insert the plug 11 into the sleeve to ensure the attachment of the film to the hub of the spool.

It is of course understood that the device described could also be employed for the fastening of any tape to the hub of a spool, in particular for fixing a magnetic tape in the case of magnetic recording devices.

I claim:
1. A fastening device for securing the end of a strip member on a spool having a hub provided with an axial slot and including a recess in the interior thereof, said device comprising a sleeve adapted to be axially inserted in said recess and having a longitudinal slot through the wall thereof, the interior of said sleeve providing a cylindrical housing into which the strip end may be disposed, and a longitudinal plug element axially insertable into said sleeve within said recess to wedge the strip end against the inner wall of said sleeve housing.

2. A fastening device according to claim 1, wherein said plug element includes a tapered end whereby the deflection of said strip end is facilitated as said plug is inserted into said sleeve.

3. A fastening device according to claim 1, wherein said plug includes an enlarged head having a conical recess on the undersurface thereof adapted to engage a mating portion on the juxtaposed end of said sleeve.

References Cited

UNITED STATES PATENTS

| 1,368,415 | 2/1921 | Tanner | 242—74.2 |
| 2,775,413 | 12/1956 | Liebman et al. | 242—74.2 |
| 2,891,737 | 6/1959 | Hasbrouck | 242—74.2 |
| 2,946,533 | 7/1960 | Johnston | 242—74.1 |

FRANK J. COHEN, *Primary Examiner.*

N. L. MINTZ, *Examiner.*